(12) United States Patent
Ferren

(10) Patent No.: US 9,788,075 B2
(45) Date of Patent: Oct. 10, 2017

(54) TECHNIQUES FOR AUGMENTING A DIGITAL ON-SCREEN GRAPHIC

(75) Inventor: Bran Ferren, Beverly Hills, CA (US)

(73) Assignee: INTEL CORPORATION, Santa Clara, CA (US)

(*) Notice: Subject to any disclaimer, the term of this patent is extended or adjusted under 35 U.S.C. 154(b) by 444 days.

(21) Appl. No.: 13/818,948

(22) PCT Filed: Aug. 25, 2011

(86) PCT No.: PCT/US2011/049194
§ 371 (c)(1),
(2), (4) Date: Feb. 25, 2013

(87) PCT Pub. No.: WO2012/027594
PCT Pub. Date: Mar. 1, 2012

(65) Prior Publication Data
US 2013/0159856 A1    Jun. 20, 2013

Related U.S. Application Data

(60) Provisional application No. 61/377,588, filed on Aug. 27, 2010.

(51) Int. Cl.
*H04N 21/63*  (2011.01)
*H04N 21/422* (2011.01)
(Continued)

(52) U.S. Cl.
CPC ............ *H04N 21/632* (2013.01); *G01S 5/20* (2013.01); *G06F 3/017* (2013.01); *G06F 3/0346* (2013.01);
(Continued)

(58) Field of Classification Search
CPC ..... G06K 9/3266; G06F 3/041; G06F 3/0485; G06F 3/048; G06F 3/017; G06F 3/0346;
(Continued)

(56) References Cited

U.S. PATENT DOCUMENTS 5,929,849 A  *  7/1999  Kikinis ......................... 725/113
6,757,906 B1     6/2004  Look et al.
(Continued)

FOREIGN PATENT DOCUMENTS

JP           5260468       10/1993
JP          2010113445      5/2010
(Continued)

OTHER PUBLICATIONS

Notice of Allowance received for Korean Patent Application No. 10-2013-7007707, mailed Sep. 6, 2014, 3 pages including 1 page English translation.
(Continued)

*Primary Examiner* — Amy M Levy

(57) ABSTRACT

In an embodiment, a digital on-screen graphic may be identified within a multimedia stream for an electronic display. An augmentation overlay may be determined based on the digital on-screen graphic. The augmentation overlay may be presented on the electronic display to at least partially surround the digital on-screen graphic. Other embodiments are described and claimed.

24 Claims, 12 Drawing Sheets

(51) Int. Cl.
| | | |
|---|---|---|
| H04N 21/45 | (2011.01) | |
| G06F 3/041 | (2006.01) | |
| H04N 21/437 | (2011.01) | |
| H04N 21/4147 | (2011.01) | |
| H04N 21/433 | (2011.01) | |
| G06F 3/0481 | (2013.01) | |
| H04N 21/482 | (2011.01) | |
| G06F 3/0346 | (2013.01) | |
| G06F 3/01 | (2006.01) | |
| G06F 3/038 | (2013.01) | |
| G06F 3/0482 | (2013.01) | |
| G06K 9/32 | (2006.01) | |
| H04N 5/445 | (2011.01) | |
| H04N 21/431 | (2011.01) | |
| H04N 21/654 | (2011.01) | |
| G08C 17/00 | (2006.01) | |
| G08C 17/02 | (2006.01) | |
| G08C 19/00 | (2006.01) | |
| G06F 3/048 | (2013.01) | |
| G06N 5/02 | (2006.01) | |
| G01S 5/20 | (2006.01) | |
| H04N 21/488 | (2011.01) | |
| H04N 5/91 | (2006.01) | |
| H04N 5/44 | (2011.01) | |
| G06F 3/0485 | (2013.01) | |
| H04L 29/06 | (2006.01) | |
| G06Q 30/02 | (2012.01) | |
| H04N 21/436 | (2011.01) | |
| H04N 21/443 | (2011.01) | |
| H04N 21/81 | (2011.01) | |
| H04N 21/475 | (2011.01) | |

(52) U.S. Cl.
CPC ............ *G06F 3/0383* (2013.01); *G06F 3/041* (2013.01); *G06F 3/048* (2013.01); *G06F 3/0414* (2013.01); *G06F 3/0481* (2013.01); *G06F 3/0482* (2013.01); *G06F 3/0485* (2013.01); *G06K 9/3266* (2013.01); *G06N 5/02* (2013.01); *G06Q 30/0201* (2013.01); *G08C 17/00* (2013.01); *G08C 17/02* (2013.01); *G08C 19/00* (2013.01); *H04L 65/403* (2013.01); *H04N 5/4403* (2013.01); *H04N 5/44504* (2013.01); *H04N 5/91* (2013.01); *H04N 21/4147* (2013.01); *H04N 21/42204* (2013.01); *H04N 21/42222* (2013.01); *H04N 21/437* (2013.01); *H04N 21/4312* (2013.01); *H04N 21/4333* (2013.01); *H04N 21/43615* (2013.01); *H04N 21/4432* (2013.01); *H04N 21/4436* (2013.01); *H04N 21/4508* (2013.01); *H04N 21/4516* (2013.01); *H04N 21/4532* (2013.01); *H04N 21/482* (2013.01); *H04N 21/4882* (2013.01); *H04N 21/63* (2013.01); *H04N 21/654* (2013.01); *G08C 2201/32* (2013.01); *G08C 2201/40* (2013.01); *H04N 21/4755* (2013.01); *H04N 21/8133* (2013.01); *H04N 2005/44556* (2013.01)

(58) Field of Classification Search
CPC .... G06F 3/0383; G06F 3/0481; G06F 3/0482; H04N 21/4312; H04N 5/91; H04N 5/4403; H04N 21/654; H04N 21/4532; H04N 21/4882; H04N 5/44504; H04N 21/8133; H04N 21/45; H04N 21/632; G01S 5/20; G08C 17/00; G08C 17/02; G08C 19/00; G08C 2201/32; G06N 5/02; H04L 65/403; G06Q 30/0201
USPC .......................................................... 715/716
See application file for complete search history.

(56) References Cited

U.S. PATENT DOCUMENTS

| | | | |
|---|---|---|---|
| 7,380,260 B1* | 5/2008 | Billmaier et al. | 725/37 |
| 2003/0028873 A1 | 2/2003 | Lemmons | |
| 2003/0084445 A1 | 5/2003 | Pilat | |
| 2003/0131357 A1 | 7/2003 | Kim | |
| 2004/0070628 A1* | 4/2004 | Iten | G06F 3/0482 715/810 |
| 2006/0085812 A1 | 4/2006 | Shishegar et al. | |
| 2007/0073690 A1 | 3/2007 | Boal et al. | |
| 2007/0261003 A1* | 11/2007 | Reissmueller | 715/810 |
| 2008/0062127 A1* | 3/2008 | Brodersen | G06F 3/0482 345/158 |
| 2008/0136790 A1 | 6/2008 | Hio | |
| 2008/0253656 A1 | 10/2008 | Schwartzberg et al. | |
| 2008/0276279 A1* | 11/2008 | Gossweiler | H04N 21/235 725/46 |
| 2009/0125544 A1* | 5/2009 | Brindley | 707/102 |
| 2009/0327964 A1* | 12/2009 | Mouilleseaux et al. | 715/834 |
| 2011/0093890 A1* | 4/2011 | Araki | H01R 13/6461 725/37 |
| 2011/0267291 A1* | 11/2011 | Choi | G06F 1/1692 345/173 |

FOREIGN PATENT DOCUMENTS

| | | |
|---|---|---|
| KR | 20060084945 | 7/2006 |
| WO | 0172040 | 9/2001 |

OTHER PUBLICATIONS

Office Action received for Japanese Patent Application No. 2013-526157, mailed Dec. 17, 2013, 17 pages.

Ozay et al., "Automatic TV Logo Detection and Classification in Broadcast Videos", Proceedings of the 17th European Signal Processing Conference (EURASIP 2009) <http://www.eurasip.org/Proceedings/Eusipco/Eusipco2009/contents/papers/1569186727.pdf>, 5 pages.

Extended European Search Report received for European Patent Application No. 11820667.1, mailed Dec. 19, 2014, 11 pages.

* cited by examiner

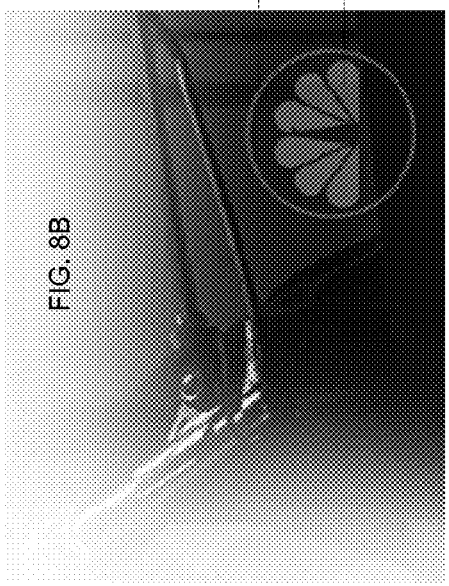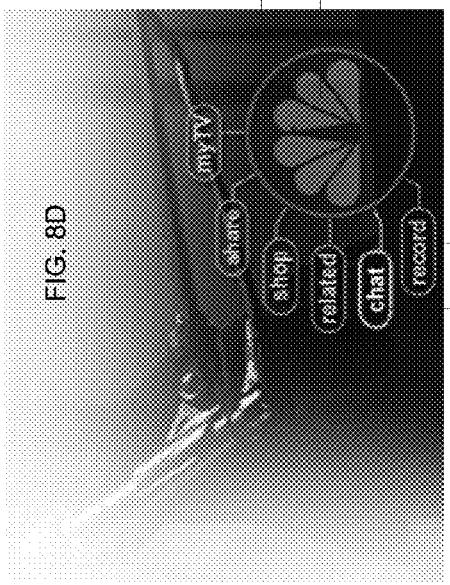
FIGs. 8A-D

1000

IDENTIFY A DIGITAL ON-SCREEN GRAPHIC WITHIN A MEDIA STREAM FOR AN ELECTRONIC DISPLAY
*1002*

SELECT AN AUGMENTATION OVERLAY BASED ON THE DIGITAL ON-SCREEN GRAPHIC
*1004*

DETERMINE ONE OR MORE SEGMENTS OF THE AUGMENTATION OVERLAY
*1006*

PRESENT THE SEGMENTED AUGMENTATION OVERLAY ON THE ELECTRONIC DISPLAY TO AT LEAST PARTIALLY ENHANCE THE DIGITAL ON-SCREEN GRAPHIC
*1008*

*FIG. 10*

TECHNIQUES FOR AUGMENTING A DIGITAL ON-SCREEN GRAPHIC

RELATED APPLICATIONS

This application claims priority to U.S. Provisional Patent Application Ser. No. 61/377,588 filed Aug. 27, 2010, which is incorporated herein by reference in its entirety.

BACKGROUND

Current entertainment systems require a user to access television programming, the internet, and personal media in three separate interfaces. Additionally, menus used in each of these systems typically are intrusive. For example, when a user views a menu on a television or computer display, the menu typically covers the entire display blocking the multimedia stream. Furthermore, the menus only refer to one type of entertainment. For example, a user can access a menu about programs on the television, but must use a computer to access his email or a website. As a result, a user must access various menus to obtain information about a form of entertainment. As there is no unified approach to the various forms of entertainment, a user must be reminded separately to perform different functions. For example, a user must go to the DVR menus in order to record a television program and must go to a different application to access his or her calendar.

Currently, television programming typically contains a visual digital on-screen graphic or bug. The digital on-screen graphic is typically a small, semi-transparent, static symbol that remains on the display during the television program. Currently, the digital on-screen graphic merely indicates the network providing the programming. The digital on-screen graphic does not provide a user with additional entertainment information.

Accordingly, there may be a need for improved techniques to solve these and other problems.

BRIEF DESCRIPTION OF THE DRAWINGS

FIGS. 8A-D illustrate an embodiment of a visually augmented digital on-screen graphic.

FIG. 10 illustrates one embodiment of a logic flow.

DETAILED DESCRIPTION

Figure 1:
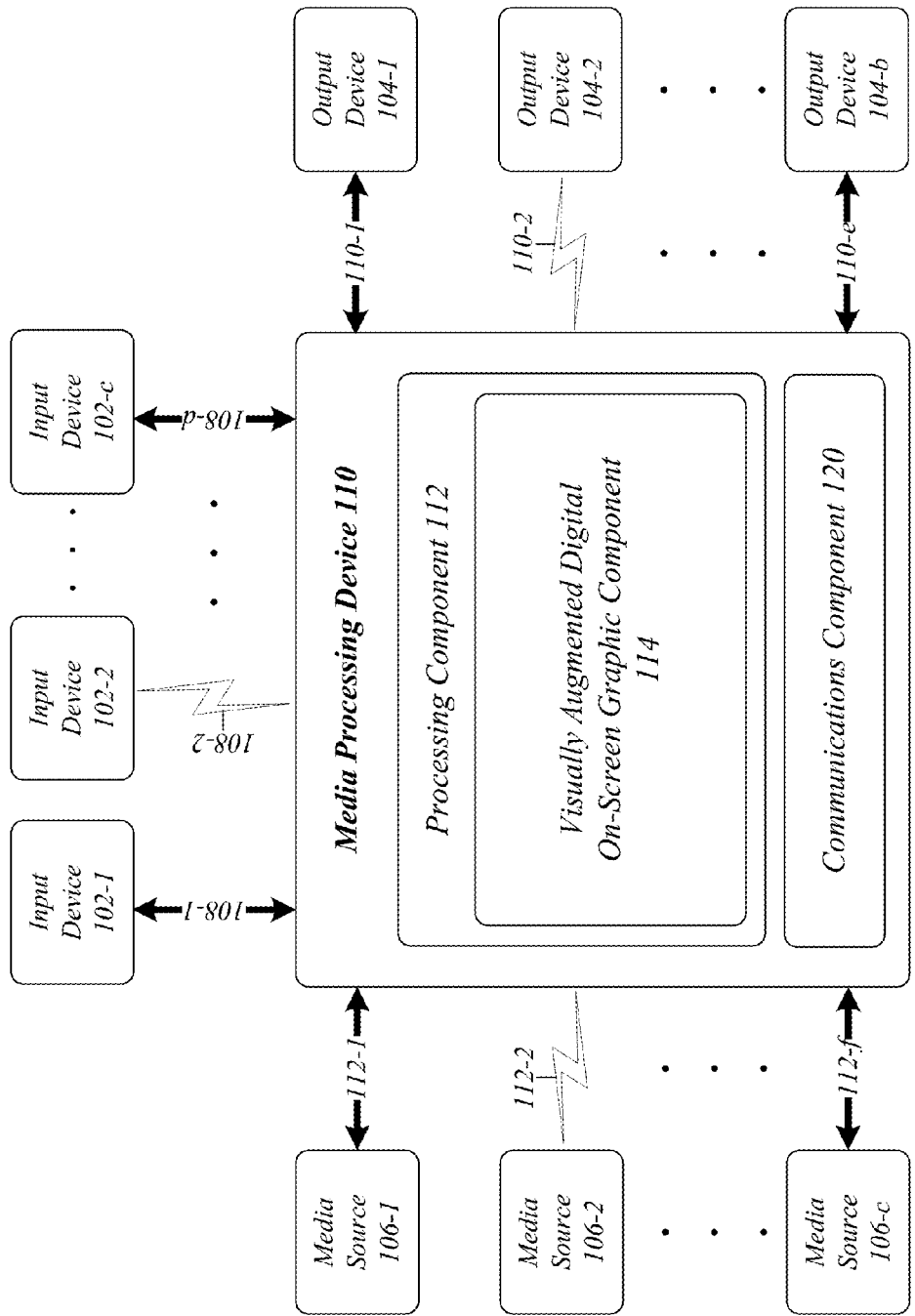
FIG. 1 illustrates one embodiment of a media processing system.

Consumer electronics, processing systems and communications systems are converging. For instance, consumer electronics such as digital televisions and media centers are evolving to include processing capabilities typically found on a computer and communications capabilities typically found in mobile devices. As such, heterogeneous consumer electronics continue to evolve into a single integrated system, sometimes referred to as a "digital home system."

A digital home system may be arranged to provide a compelling entertainment environment in which a user can move seamlessly between television viewing, internet access, and home media management in various embodiments. In some embodiments, a single flexible and dynamic interface may allow a user to find the television programming that they wish to view, acquire the information that they seek from the Web, or enjoy personal audio files, photos, and movies. The system may also facilitate enhanced television viewing, enable collaborative interaction with family and friends, and securely execute financial transactions. A digital home system may provide these features while retaining the familiar design sensibilities and ease-of-use of a traditional television.

In various embodiments, a digital home system may address common deficiencies associated with current entertainment systems in which access to television programming, the internet, and personal media requires operation of three separate interfaces. For example, a unified interface of the digital home system may incorporate physical and graphical elements tied to an easily understood underlying organizational framework, making a home entertainment experience more interesting, compelling, engaging, and efficient. A unified interface may combine the best aspects of the three integrated paradigms, e.g., those of television, internet, and computers. For example, elements such as animation, information-rich displays, and video and audio cues from traditional televisions and television menus may be incorporated into the unified interface. Similarly, seamless integration of different forms of content and communications mechanisms from traditional internet experiences, allowing links from one form of content to another and providing tools such as messaging and video conferencing may also be incorporated. And from computers, point-and-click mechanisms that allow effective navigation of complex information spaces may also be part of the unified interface of the digital home system in various embodiments.

The digital home system may utilize, in some embodiments, a visual display such as a television display as a navigation device. Using the display in combination with any number of remote control devices, a user can carry out complex tasks in fulfilling and transformative ways. The digital home system may include familiar mechanisms such as on-screen programming guides, innovative technologies that facilitate navigation via natural motions and gestures and context-sensitivity that understands the user and the options available to the user which all combine to make the digital home system experience intuitive and efficient as it empowers the user to utilize multiple devices in a seamlessly integrated way.

For a typical television-viewing, media-perusing, and web-browsing home user, the digital home system may be arranged to provide a unified home entertainment experience, allowing the user to freely navigate through television, media, and internet offerings from a traditional viewing position (such as a sofa) using a unified interface. In some embodiments, the unified interface integrates the information provided by a diverse array of devices and services into the existing television or other display in a functionally seamless and easily understood manner.

The digital home system may include, in various embodiments, a multi-axis integrated on-screen navigation allowing the display screen to be used for navigation as well as for the presentation of content. In some embodiments, the digital home system may also include a user interface engine operative to provide context-sensitive features and overlays intelligently integrated with the underlying content and adaptive to the viewing environment. A family of remote control and other input/output device may also be incorporated into the digital home system in various embodiments to further enhance the intuitive user interactions, ease of use and overall quality of the system. The embodiments are not limited in this context.

Various embodiments are directed to techniques for visually augmenting a digital on-screen graphic. In an embodiment, a digital on-screen graphic may be identified within a multimedia stream. An augmentation overlay may be determined based on the digital on-screen graphic. The augmentation overlay may be presented to at least partially enhance the digital on-screen graphic. Thus, a user may easily access various forms of entertainment and be reminded of various entertainment-related events while viewing a multimedia stream. Entertainment-related events may include media-related events. Entertainment-related events may include events such as, a television program scheduled to air, a movie to be recorded on a DVR, a new e-mail, and/or an update to a website, among other examples.

In an embodiment, a user may be watching a multimedia stream on the display in the digital home system. Multimedia stream may be the type of entertainment currently displayed on a user's display. In an embodiment, multimedia stream may be a movie or a television program via a broadcast station. In an embodiment, the multimedia stream may include one or more video frames. In an embodiment, the multimedia stream may include a live feed.

Embedded in the multimedia stream may be a digital on-screen graphic or bug. The digital on-screen graphic may be a semi-transparent icon which indicates to the viewer the network providing the programming.

In an embodiment, a user may decide that he/she would like to view other entertainment options on a display. In an embodiment, entertainment options may be automatically presented on a display. The digital on-screen graphic may be visually augmented to provide the user with information about the various entertainment options. An augmentation overlay may be determined based on the digital on-screen graphic. The augmentation overlay may be determined such that the augmentation overlay is unobtrusive to the multimedia stream.

In an embodiment, the augmentation overlay may be divided into segments. A segment may provide a menu access point. In an embodiment, a segment may correspond to a menu item or category within an entertainment menu. A segment may be selected by a user to trigger a secondary object. A secondary object may be a program, an application or a function. In an embodiment, the secondary object may be accessed directly from the segment. For example, a selected segment may trigger a particular application, such as e-mail, to be presented on the display. Furthermore, a segment may alert a user of upcoming entertainment-related events. In an embodiment, the augmentation overlay may flash at a defined rate based on an entertainment-related event. For example, a segment may flash to alert a user of a possible television program he or she may want to record.

In an embodiment, a segmented augmentation overlay may be presented on the display. The segmented augmentation overlay may at least partially surround the digital on-screen graphic. The segmented augmentation overlay may allow a user to easily access various forms of entertainment. As a result, the embodiments can improve affordability, scalability, modularity, extendibility, or interoperability for an operator, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram for in order to facilitate a description thereof. The intention is to cover all modifications, equivalents, and alternatives falling within the spirit and scope of the claimed subject matter.

FIG. 1 illustrates a block diagram for a media processing system 100. The media processing system 100 is generally directed to performing media processing operations for media content in accordance with any associated control signaling necessary for presenting media content on an output device. In one embodiment, the media processing system 100 is particularly arranged to provide media content from disparate media sources to viewers in a home environment, such as a digital home system, for example. However, the media processing system 100 may be suitable for any use scenarios involving presentation and display of media content. Although the media processing system 100 shown in FIG. 1 has a limited number of elements in a certain topology, it may be appreciated that the media processing system 100 may include more or less elements in alternate topologies as desired for a given implementation. The embodiments are not limited in this context.

In various embodiments, various elements of the media processing system 100 may communicate, manage, or process information in accordance with one or more protocols. A protocol may comprise a set of predefined rules or instructions for managing communication among nodes. A protocol may be defined by one or more standards as promulgated by a standards organization, such as, the International Telecommunications Union (ITU), the International Organization for Standardization (ISO), the International Electrotechnical Commission (IEC), the Institute of Electrical and Electronics Engineers (IEEE), the Internet Engineering Task Force (IETF), the Motion Picture Experts Group (MPEG), and so forth. For example, the described embodiments may be arranged to operate in accordance with standards for media processing, such as the National Television Systems Committee (NTSC) standards, the Advanced Television Systems Committee (ATSC) standards, the Phase Alteration by Line (PAL) standards, the MPEG-1 standard, the MPEG-2 standard, the MPEG-4 standard, the Open Cable standard, the Society of Motion Picture and Television Engineers (SMPTE) Video-Codec (VC-1) standards, the ITU/IEC H.263 and H.264 standards, and others. Another example may include various Digital Video Broadcasting (DVB) standards, such as the Digital Video Broadcasting Terrestrial (DVB-T) broadcasting standard, the DVB Satellite (DVB-S) broadcasting standard, the DVB Cable (DVB-C) broadcasting standard, and others. Digital Video Broadcasting (DVB) is a suite of internationally accepted open standards for digital television. DVB standards are maintained by the DVB Project, an international industry consortium, and they are published by a Joint Technical Committee (JTC) of European Telecommunications Standards Institute (ETSI), European Committee for Electrotechnical Standardization (CENELEC) and European Broadcasting Union (EBU). The embodiments are not limited in this context.

In various embodiments, elements of the media processing system 100 may be arranged to communicate, manage or process different types of information, such as media information and control information. Examples of media information may generally include any data or signals representing multimedia content meant for a user, such as media content, voice information, video information, audio information, image information, textual information, numerical information, alphanumeric symbols, graphics, and on forth. Control information may refer to any data or signals representing commands, instructions, control directives or control words mean for an automated system. For example, control information may be used to route media information through a system, to establish a connection between devices, instruct a device to process the media information in a predetermined manner, monitor or communicate status, perform synchronization, and so forth. The embodiments are not limited in this context.

In various embodiments, media processing system 100 may be implemented as a wired communication system, a wireless communication system, or a combination of both. Although media processing system 100 may be illustrated using a particular communications media by way of example, it may be appreciated that the principles and techniques discussed herein may be implemented using any type of communication media and accompanying technology. The embodiments are not limited in this context.

When implemented as a wired system, for example, the media processing system 100 may include one or more elements arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a device using an input/output (I/O) adapter. The I/O adapter may be arranged to operate with any suitable technique for controlling information signals between elements using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, the media processing system 100 may include one or more wireless elements arranged to communicate information over one or more types of wireless communication media. An example of wireless communication media may include portions of a wireless spectrum, such as the RF spectrum. The wireless elements may include components and interfaces suitable for communicating information signals over the designated wireless spectrum, such as one or more antennas, wireless transmitters, receiver, transmitters/receivers ("transceivers"), amplifiers, filters, control logic, antennas, and so forth. The embodiments are not limited in this context.

In the illustrated embodiment shown in FIG. 1, the media processing system 100 may comprise a media processing device 110. The media processing device 110 may further comprise one or more input devices 102-a, one or more output devices 104-b, and one or more media sources 106-c.

The media processing device 110 may be communicatively coupled to the input devices 102-a, the output devices 104-b, and the media sources 106-c via respective wireless or wired communications connections 108-d, 110-e and 112-f.

It is worthy to note that "a" and "b" and "c" and similar designators as used herein are intended to be variables representing any positive integer. Thus, for example, if an implementation sets a value for a=5, then a complete set of input devices 102-a may include computing devices 102-1, 102-2, 102-3, 102-4 and 102-5. The embodiments are not limited in this context.

While various embodiments refer to input devices 102-a providing information to media processing device 110 and output devices 104-b receiving information from media processing device, it should be understood that one or more of the input devices 102-a and output device 104-b may allow for the exchange of information to and from media processing device 110 via their respectively connections 108-d and 110-e. For example, one or more of input devices 102-a may be operative to provide information to media processing device 110 and to receive information from media processing device 110. In various embodiments, one or more of output devices 104-b may be operative to receive information from media processing device 110 and may also be operative to provide information to media processing device 110. Similarly, there may be a bi-directional exchange between the media processing device 110 and media sources 106-c. For instance, a media source 106-c may be operative to provide media information to the media processing device 110 and to receive information from the media processing device 110. An example of this would be a video on demand (VOD) application implemented by the media processing device 110. The embodiments are not limited in this context.

In various embodiments, the media processing system 100 may include one or more input devices 102-a. In general, each input device 102-a may comprise any component or device capable of providing information to the media processing device 110. Examples of input devices 102-a may include without limitation remote controls, pointing devices, keyboards, keypads, trackballs, trackpads, touchscreens, joysticks, game controllers, sensors, biometric sensors, thermal sensors, motion sensors, directional sensors, microphones, microphone arrays, video cameras, video camera arrays, global positioning system devices, mobile computing devices, laptop computers, desktop computers, handheld computing devices, tablet computing devices, netbook computing devices, smart phones, cellular telephones, wearable computers, and so forth. The embodiments are not limited in this context.

In various embodiments, the media processing system 100 may include one or more output devices 104-b. An output device 104-b may comprise any electronic device capable of reproducing, rendering or presenting media content for consumption by a human being. Examples of output devices 104-b may include without limitation a display, an analog display, a digital display, a television display, audio speakers, headphones, a printing device, lighting systems, warning systems, mobile computing devices, laptop computers, desktop computers, handheld computing devices, tablet computing devices, netbook computing devices and so forth. The embodiments are not limited in this context.

In one embodiment, for example, the media processing system 100 may include a display 104-1. The display 104-1 may comprise any analog or digital display capable of presenting media information received from media sources 106-c. The display 104-1 may display the media information at a defined format resolution. In various embodiments, for example, the incoming video signals received from media sources 106-c may have a native format, sometimes referred to as a visual resolution format. Examples of a visual resolution format include a digital television (DTV) format, high definition television (HDTV), progressive format, computer display formats, and so forth. For example, the media information may be encoded with a vertical resolution format ranging between 480 visible lines per frame to 1080 visible lines per frame, and a horizontal resolution format ranging between 640 visible pixels per line to 1920 visible pixels per line. In one embodiment, for example, the media information nay be encoded in an HDTV video signal having a visual resolution format of 720 progressive (720p), which refers to 720 vertical pixels and 1280 horizontal pixels (720×1280). In another example, the media information may have a visual resolution format corresponding to various computer display formats, such as a video graphics array (VGA) format resolution (640×480), an extended graphics array (XGA) format resolution (1024×768), a super XGA (SXGA) format resolution (1280×1024), an ultra XGA (UXGA) format resolution (600×1200), and so forth. The embodiments are not limited in this context. The type of displays and format resolutions may vary in accordance with a given set of design or performance constraints, and the embodiments are not limited in this context.

In various embodiments, the media processing system 100 may include one or more media sources 106-c. Media sources 106-c may comprise any media source capable of sourcing or delivering media information and/or control information to media processing device 110. More particularly, media sources 106-c may comprise any media source capable of sourcing or delivering digital audio and/or video (AV) signals to media processing device 110. Examples of media sources 106-c may include any hardware or software element capable of storing and/or delivering media information, such as a digital video recorder (DVR), a personal video recorder (PVR), a digital versatile disc (DVD) device, a video home system (VHS) device, a digital VHS device, a disk drive, a hard drive, an optical disc drive a universal serial bus (USB) flash drive, a memory card, a secure digital (SD) memory card, a mass storage device, a flash drive, a computer, a gaming console, a compact disc (CD) player, computer-readable or machine-readable memory, a digital camera, camcorder, video surveillance system, teleconferencing system, telephone system, medical and measuring instruments, scanner system, copier system, television system, digital television system, set top boxes, personal video records, server systems, computer systems, personal computer systems, smart phones, tablets, notebooks, handheld computers, wearable computers, portable media players (PMP), portable media recorders (PMR), digital audio devices (e.g., MP3 players), digital media servers and so forth. Other examples of media sources 106-c may include media distribution systems to provide broadcast or streaming analog or digital AV signals to media processing device 110. Examples of media distribution systems may include, for example, Over The Air (OTA) broadcast systems, terrestrial cable systems (CATV), satellite broadcast systems, and so forth. It is worthy to note that media sources 106-c may be internal or external to media processing device 110, depending upon a given implementation. The embodiments are not limited in this context.

In various embodiments, the media processing system 100 may include one or more media processing devices 110. The media processing device 110 may comprise any electronic device arranged to receive, process, manage, and/or present media information received from media sources 106-c. In general, the media processing device 110 may include, among other elements, a processing system, a processing sub-system, a processor, a computer, a device, an encoder, a decoder, a coder/decoder (codec), a filtering device (e.g., graphic scaling device, deblocking filtering device), a transformation device, an entertainment system, a display, or any other processing or communications architecture. The embodiments are not limited in this context.

The media processing device 110 may execute processing operations or logic for the media processing system 100 using a processing component 112. The processing component 112 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The media processing device 110 may execute communications operations or logic for the media processing system 100 using communications component 120. The communications component 120 may implement any well-known communications techniques and protocols, such as techniques suitable for use with packet-switched networks (e.g., public networks such as the Internet, private networks such as an enterprise intranet, and so forth), circuit-switch networks (e.g., the public switched telephone network), or a combination of packet-switched networks and circuit-switched networks (with suitable gateways and translators). The communications component 120 may include various types of standard communication elements, such as one or more communications interfaces, network interfaces, network interface cards (NIC), radios, wireless transmitters/receivers (transceivers), wired and/or wireless communication media, infra-red transceivers, serial interfaces, parallel interfaces, bus interfaces, physical connectors, and so forth. By way of example, and not limitation, communication media 120 includes wired communications media and wireless communications media, as previously described.

In various embodiments, the media processing device 110 may comprise a visually augmented digital on-screen graphic component 114. The visually augmented digital on-screen graphic component 114 is shown as part of a media processing device 110 for purposes of illustration and not limitation. It should be understood that the visually augmented digital on-screen graphic component 114 could be located in other devices, components or nodes of a media processing system 100 in various embodiments and still fall within the described embodiments.

Figure 2:
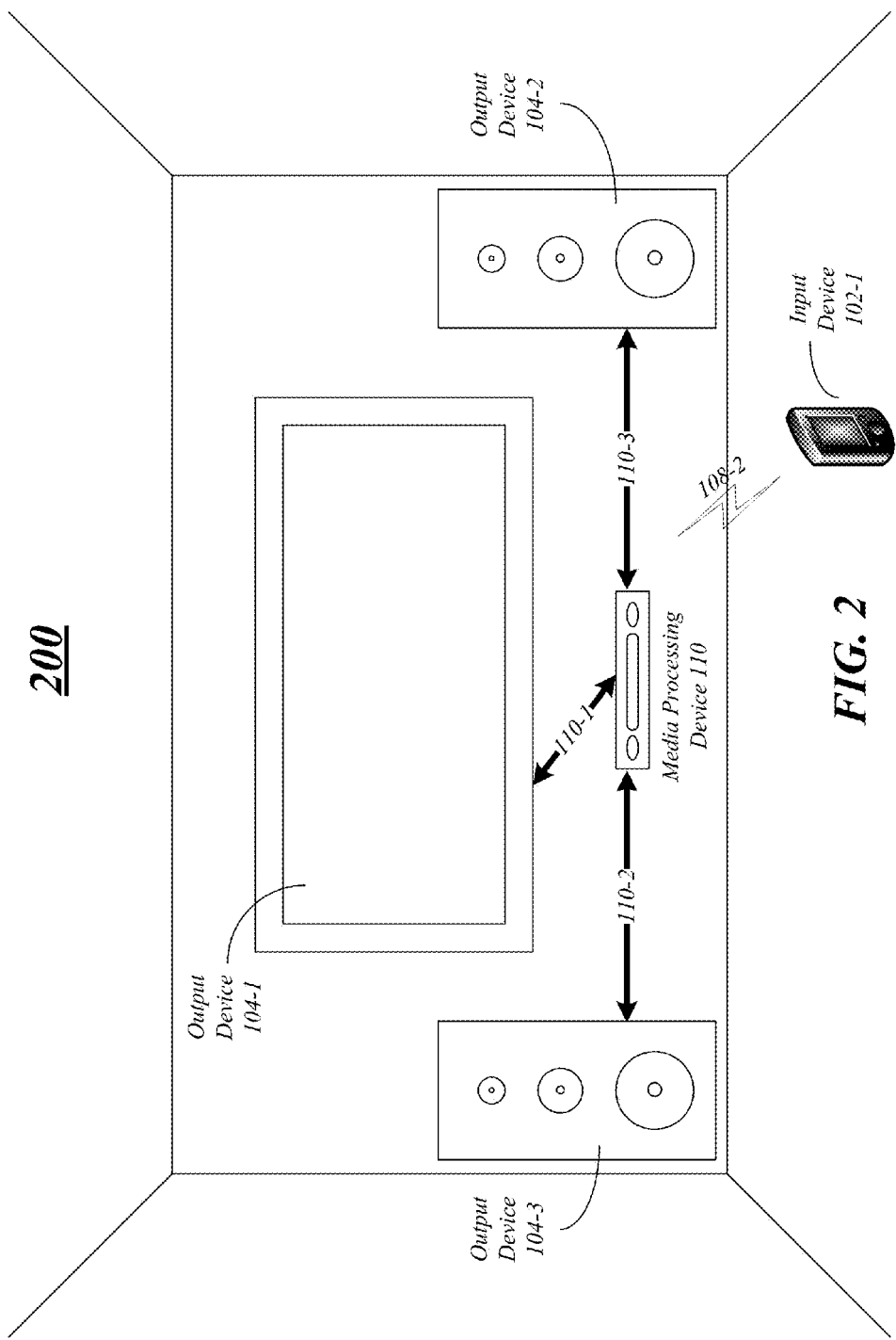
FIG. 2 illustrates one embodiment of a media processing component.

FIG. 2 illustrates a block diagram for a media processing system 200 that may be the same or similar to media processing system 100 of FIG. 1 where like elements are similarly numbered. The media processing system 200 may comprise a sample digital home system implementation that is arranged to provide media content from disparate media sources to viewers in a home, office, or room environment. Although the media processing system 200 shown in FIG. 2 has a limited number of elements in a certain topology, it may be appreciated that the media processing system 200 may include more or less elements in alternate topologies as desired for a given implementation. The embodiments are not limited in this context.

In the illustrated embodiment shown in FIG. 2, the media processing system 200 may comprise a media processing device 110, input device 102-1, output devices 104-1, 104-2 and 104-3, and one or more media sources 106 (not shown). The media processing device 110 may be communicatively coupled to the input device 102-1, the output devices 104-1, 104-2 and 104-3, and the media sources 106 via respective wireless or wired communications connections 108-2, 110-1, 110-2 and 110-3. For purposes of illustration, the one or more media sources 106 of FIG. 2 (not shown) are part of, or integrated into, media processing device 110. Other embodiments are described and claimed.

In various embodiments, media processing device 110 may comprise a set-top box, digital media hub, media server, or other suitable processing device arranged to control the digital home system 200. While shown as a separate component in FIG. 2, it should be understood that media processing device 110 may be arranged as part of output device 104-1 or any other suitable component of system 200 in some embodiments. Output device 104-1 may comprise a digital television arranged to display information received from media processing device 110 over connection 110-1 in some embodiments. In various embodiments, output devices 104-2 and 104-3 may comprise speakers arranged to reproduce audio or other acoustic signals received from media processing device 110 over connections 110-2 and 110-3 respectively. Input device 102-1 may comprise a remote control, smart phone, or other suitable processing device capable of communicating with media processing device 110, output device 104-1 or any other device in the digital home system 200. Together, each of the components, nodes or devices of media processing system 200 may form or comprise one example embodiment of digital home entertainment system. The embodiments are not limited to the type, number or arrangement of components illustrated in FIG. 2.

Figure 3:
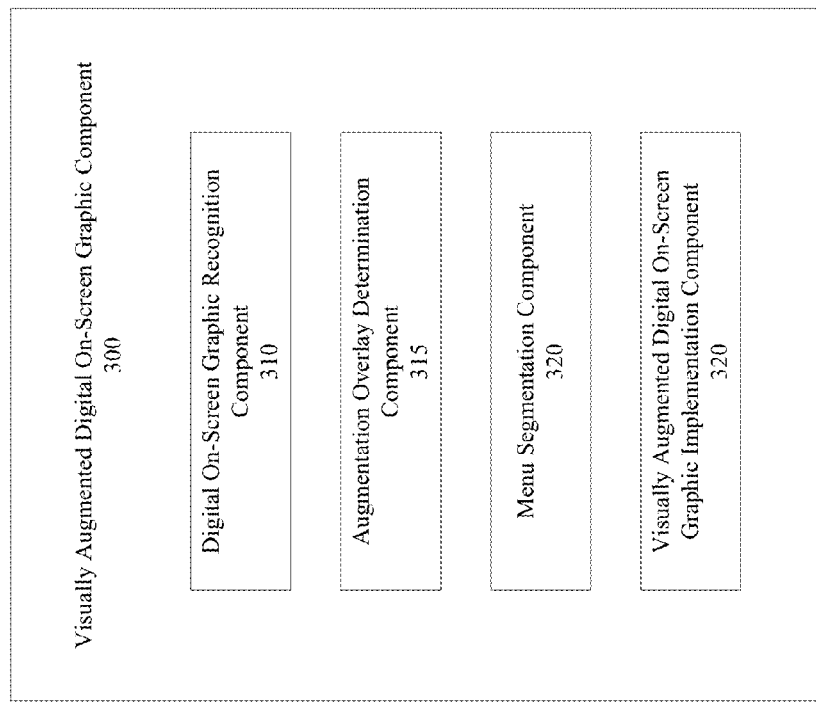
FIG. 3 illustrates an embodiment of a visually augmented a digital on-screen graphic component.

FIG. 3 illustrates an embodiment of a visually augmented digital on-screen graphic component 300. In an embodiment, a visually augmented digital on-screen graphic component 300 may include a digital on-screen graphic recognition component 310, an augmentation overlay determination component 315, a menu segmentation component 320, and a visually augmented digital on-screen graphic implementation component 330.

The visually augmented digital on-screen graphic component 300 may create unified access to various forms of entertainment in a visually unobtrusive way. The visually augmented digital on-screen graphic component may be visually unobtrusive as television viewers are conditioned to seeing the digital on-screen graphic. As a result, visually augmenting the digital on-screen graphic may be easily accepted by users. The visually augmented digital on-screen graphic component 305 may augment the digital on-screen graphic already embedded in the multimedia stream. A media processing device may visually augment the digital on-screen graphic to include information about various forms of media without interruption to the multimedia stream on the electronic display.

Figure 4:
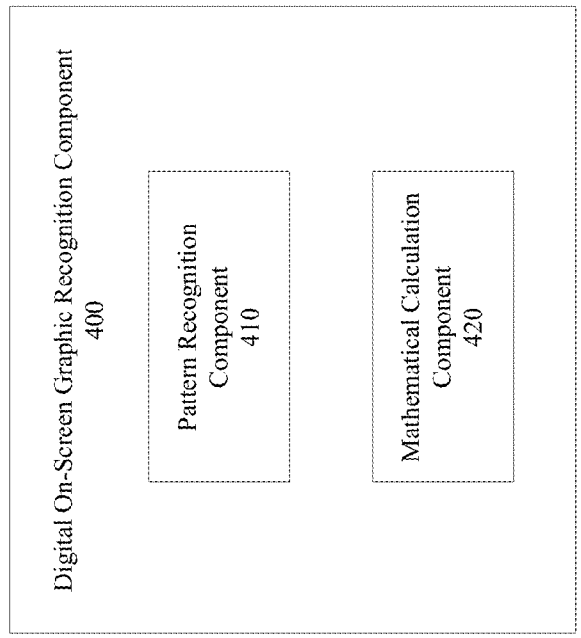
FIG. 4 illustrates an embodiment of the digital on-screen graphic recognition component.

FIG. 4 illustrates an embodiment of the digital on-screen graphic recognition component. The digital on-screen graphic recognition component 400 may be used to determine a digital on-screen graphic from a multimedia stream. In an embodiment, the multimedia stream may be a live feed. In an embodiment, the digital on-screen graphic may be identified from one or more video frames of a multimedia stream.

In an embodiment, a digital on-screen graphic may be referred to as a bug. In an embodiment, a digital on-screen graphic may be a watermark-like logo used to identify a television network. In an embodiment, the digital on-screen graphic may be a recognizable mark or logo, such as, but not limited to, the NBC® peacock and/or the CBS® eye.

In an embodiment, the digital on-screen graphic may be a static, persistent image appearing in the same location on one or more frames of a multimedia stream. In an embodiment, the multimedia stream may be a broadcast multimedia stream. As the digital on-screen graphic is a static image, the digital on-screen graphic recognition component 400 may determine the digital on-screen graphic using one or more sequential frames from a multimedia stream.

In an embodiment, the digital on-screen graphic recognition component 400 may include a pattern recognition component 410. In an embodiment, a pattern recognition component 410 may use a pattern matching algorithm to locate the digital on-screen graphic. A pattern recognition component 410 may use the pattern matching algorithm to determine whether an image element or portion of an image is repeated in one or more sequential frames. The pattern recognition component 410 may determine whether the repeated image is a static image, appearing in the same location in one or more frames. In an embodiment, the pattern recognition component 410 may use pattern recognition to determine whether the repeated image in one or more sequential frames matches an image in a library of images. If the repeated image in one or more sequential frames appears in the library, then the pattern recognition component 410 may determine that the repeated image is the digital on-screen graphic. For example, a library of images may include images of the digital on-screen graphic for a plurality of networks. In an embodiment, pattern recognition may identify static images from the frames that match images in the library.

The digital on-screen graphic recognition component 400 may include a mathematical calculation component 420. The mathematical calculation component 420 may use a mathematical calculation to determine the digital on-screen graphic using multiple sequential frames of the multimedia stream. In an embodiment, the mathematical calculation component 420 may determine which image is the digital on-screen graphic using an integration calculation. By integrating across the frames, the fluctuations of non-static elements may cancel out over time and the persistent elements of an image may dominate the calculation. For example, an integration calculation may use the last 10-60 frames to determine which image is the digital on-screen graphic. For example, an integration calculation may use the last set of frames over 2-5 seconds to determine which image is the digital on-screen graphic.

In an embodiment, the digital on-screen graphic recognition component 400 may search the entire frame to determine whether there is a digital on-screen image. Typically, the digital on-screen graphic appears in the lower right corner of a frame. In an embodiment, the digital on-screen graphic recognition component 400 may search the bottom half of the frames for a digital on-screen graphic. The digital on-screen graphic recognition component 400 may search the bottom third of the frames for a digital on-screen graphic. In an embodiment, the digital on-screen graphic recognition component 400 may search only the right side of the frames for a digital on-screen graphic. In an embodiment, the digital on-screen graphic recognition component 400 may search only the right side, lower third of the frames for a digital on-screen graphic. The embodiments are not limited in this context.

Figure 5:
FIG. 5 illustrates an embodiment of the augmentation overlay determination component.

FIG. 5 illustrates an embodiment of the augmentation overlay determination component 500. In an embodiment, the augmentation overlay determination component 500 may determine an augmentation overlay based on the digital on-screen graphic. In an embodiment, the augmentation overlay determination component 500 may select an augmentation overlay based on characteristics of the digital on-screen graphic.

In an embodiment, the augmentation overlay determination component 500 may include a shape determination component 505. The shape determination component 505 may determine a shape of a digital on-screen graphic. In an embodiment, an augmentation overlay may be determined based on the shape of the digital on-screen graphic. In an embodiment, the shapes of the augmentation overlay may be a circle, a rectangle, a triangle or another polygon. Other augmentation overlay shapes may be implemented as well.

Based on the shape of the digital on-screen graphic, an appropriate augmentation overlay may be determined by the shape determination component 505. For example, if the digital on-screen graphic is a circle a circular augmentation overlay may be determined. For example, if the digital on-screen graphic is a pentagon a pentagonal augmentation overlay may be determined.

In an embodiment, while the augmentation overlay may be determined based on the digital on-screen graphic, the augmentation overlay does not have to be the same shape as the digital on-screen graphic. For example, if the digital on-screen graphic is a square, a rectangular augmentation overlay may be determined. For example, if the digital on-screen graphic is an eclipse, a circular augmentation overlay may be determined. For example, if the digital on-screen graphic is a pentagon, a polygon augmentation overlay may be determined. The embodiments are not limited in this context.

In an embodiment, the shape determination component 505 may determine the shape of the digital on-screen graphic and an augmentation overlay that is a different shape may be determined. For example, the digital on-screen graphic may be a triangle and the augmentation overlay may be a circle. In an embodiment, a finite number of augmentation overlays may be created and used by the augmentation overlay determination component 500.

In an embodiment, the augmentation overlay determination component 500 may include a size determination component 510. In an embodiment, the size determination component 510 may scale the augmentation overlay based on the size of the digital on-screen graphic. In an embodiment, the size determination component 510 may stretch or expand the augmentation overlay to fit around the digital on-screen graphic. In an embodiment, the size determination component 510 may shrink the augmentation overlay fit around the digital on-screen graphic. In an embodiment, the overlay may be scaled in a non-uniform manner or warped to fit at least partially around the digital on-screen graphic. In an embodiment, the augmentation overlay may be proportional to the size of the digital on-screen graphic. For example, the augmentation overlay may be ⅙ to ⅓ larger than the digital on-screen graphic.

In an embodiment, a size of the augmentation overlay may be determined by the size determination component 510 such that the augmentation overlay may be overlaid on top of the digital on-screen graphic. In an embodiment, the augmentation overlay may at least partially enhance the digital on-screen graphic. In an embodiment, the augmentation overlay may at least partially surround the digital on-screen graphic.

In an embodiment, the augmentation overlay determination component 500 may include an alpha compositing component 513. In an embodiment, the alpha compositing component 513 may determine that the augmentation overlay may be semi-transparent. In an embodiment, a semi-transparent augmentation overlay may enhance the digital on-screen graphic. In an embodiment, the augmentation overlay interior (e.g., the middle of the augmentation overlay) may be transparent so as to present the augmentation overlay surrounding at least a part of the digital on-screen graphic. For example, a circle augmentation overlay may appear as a ring. For example, only the outline of a square may be depicted surrounding a digital on-screen graphic.

In an embodiment, the augmentation overlay determination component 500 may include a color determination component 515. The exterior or outside of the augmentation overlay may be visually depicted using one or more colors. In an embodiment, the color determination component 515 may determine the colors of the digital on-screen graphic. In an embodiment, the colors determined by the color determination component 515 may be used to create an augmentation overlay that matches or complements the digital on-screen graphic. In an embodiment, the colors determined by the color determination component 515 may be used to create an augmentation overlay that blends with the images presented in the multimedia stream. In an embodiment, the augmentation overlay may be created so that it is not visually distracting from the other imagery on the frame.

In an embodiment, the augmentation overlay determination component 500 may include a dimensions determination component 520. In an embodiment, the dimensions determination component 520 may determine whether the digital on-screen graphic is one-dimensional, two-dimensional or three-dimensional. The dimensions determination component 520 may ensure the augmentation overlay dimensionality matches the dimensionality of the digital on-screen graphic. The augmentation overlay may be presented in an aesthetic that matches other visual elements in the multimedia stream.

In an embodiment, the digital on-screen graphic recognition component 400 may not locate a digital on-screen graphic within the multimedia stream. For example, during a television program a digital on-screen graphic may be located. However, during a commercial, the digital on-screen graphic may disappear from the multimedia stream. In an embodiment, the digital on-screen graphic recognition component 400 may not locate a digital on-screen graphic because a movie is being shown on the electronic display that is not associated with a broadcast channel.

In an embodiment, when no digital on-screen graphic is located by the digital on-screen graphic recognition component 400, the augmentation overlay determination component 400 may present an augmentation overlay on the electronic display without the digital on-screen graphic. In an embodiment, if no digital on-screen graphic is located, the augmentation overlay may be presented in a default location. In an embodiment, the augmentation overlay may be minimized when there is no digital on-screen graphic. In an embodiment, the augmentation overlay may remain in the same location it was positioned when a digital on-screen graphic was presented in a prior frame. In an embodiment, the augmentation overlay may disappear when the digital on-screen graphic disappears and the augmentation overlay may reappear when the digital on-screen graphic reappears.

Figure 6:
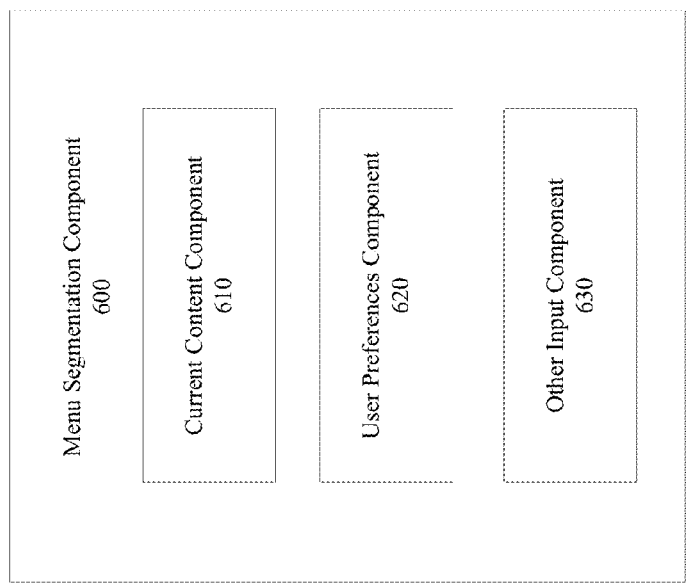
FIG. 6 illustrates an embodiment of the menu segmentation component.

FIG. 6 illustrates an embodiment of the menu segmentation component 600. In an embodiment, a menu segmentation component 600 may divide the augmentation overlay into one or more segments.

In an embodiment, the menu segmentation component 600 may configure the segments to trigger secondary objects. A secondary object may be a program, an application and/or a function. Secondary objects may be items that correspond to various aspects of an entertainment system. For example, the secondary objects may include, but are not limited to, web shopping, enhanced content, chat with other users, sharing information with other users, e-mail, and/or other events or recommendations on the DVR, among other examples.

In an embodiment, the augmentation overlay may include one or more segments. In an embodiment, the segments may be the non-transparent parts of the semi-transparent augmentation overlay. For example, on a circular augmentation overlay, the interior of the circle may be transparent to allow the digital on-screen graphic to be presented. The outer edge or ring of the circle may be segmented.

In an embodiment, a segment may be selected by a user. In an embodiment, a user may select a segment using one or more of: a remote control, a touch sensitive device, a gesture recognition system and/or other input device, among other input devices.

In an embodiment, a segment may provide a menu access point. In an embodiment, a segment may correspond to a menu item or entertainment application. For example, a menu may have one menu item for interact, one menu item for e-mail, and/or one menu item for DVR, among other menu items. The augmentation overlay may be segmented such that each segment corresponds to a menu item.

In an embodiment, selecting a segment may raise one or more menu items. In an embodiment, menu items may be raised and/or revealed prior to a segment being selected. In an embodiment, the menu items may be raised when a cursor hovers in a location on top of or near the augmentation overlay.

In an embodiment, one or more selectable menu items may be arrayed around the digital on-screen graphic according to the augmentation overlay.

In an embodiment, selecting the menu item and/or corresponding segment may trigger a secondary object to appear on the electronic display. For example, a selected segment may trigger a secondary object which presents scheduled recording of the current or future airings of a program. For example, selecting a segment and/or corresponding menu item may trigger commerce functions or websites related to the current programming to be presented.

In an embodiment, the menu segmentation component 600 may determine the segments of the augmentation overlay via a current content component 610, a user preference component 615 and/or other input component 620.

In an embodiment, the current content component 610 may determine one or more segments based on current presented content. In an embodiment, a segment may be determined based on the current presented content for the multimedia stream. For example, if a user is watching a cooking program, the current content component 610 may determine that one segment of the augmentation overlay triggers a webpage to be presented which lists locations of where cooking items may be bought.

In an embodiment, the current content component 610 may determine the specific behavior of the secondary objects invoked by one or more segments. For example, the segments and/or menu items may always be the same and there may always be a "shop" segment and/or menu item. However, the secondary object triggered by the "shop" segment and/or menu item may be responsive to the content of the media stream. For example, if a user is watching the Martha Stewart Show®, the "shop" segment and/or item may take the user to a cooking store.

In an embodiment, segments may be determined based on a user preferences component 615. For example, a user preferences component may create a segment that triggers a favorite internet web communication to be presented on the electronic display. In an embodiment, a user preferences component 615 may create segments determined by previous selections from a user. For example, a user preferences component may create a segment that triggers a frequently viewed webpage to be presented on the electronic display.

In an embodiment, the number of segments am the behavior of the segments may be determined by a combination of information from the current content component 610 and the user preferences component 615. In an embodiment, segment number and behavior may be determined by user preferences, but driven by the content of what is being presented on the electronic display. For example, the user (preference component 610 may create a segment that triggers a shopping website, and the current content component 615 may determine the type of shopping website based on the multimedia stream.

In an embodiment, the segments may be determined based on the other input component 620. In an embodiment, the other input component 620 may determine one or more segments based on information, such as, but not limited to, historical user viewing interests, user preferences, internet cookies and/or DVR recordings, among other examples.

Figure 7:
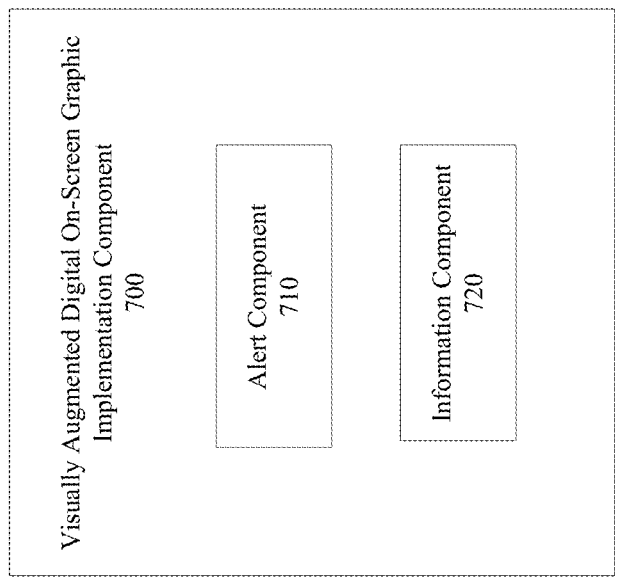
FIG. 7 illustrates one embodiment of a visually augmented digital on-screen graphic implementation component.

FIG. 7 illustrates one embodiment of a visually augmented digital on-screen graphic implementation component 700. In an embodiment, the visually augmented digital on-screen graphic implementation component 700 may include an alert component 710 and an information component 720.

In an embodiment, the visually augmented digital on-screen graphic implementation component 700 may include an alert component 710. In an embodiment, the alert component 710 may use the segmented augmentation overlay to alert a user of an entertainment-related event. In an embodiment, an alert component 710 may use the menu items corresponding to the segments to alert a user of an entertainment-related event. In an embodiment, the entertainment-related event may be based on the segments and corresponding menu items determined by the menu segmentation component. In an embodiment, an alert may indicate an activity, event of interest, or available item of interest in the secondary object accessible via the menu item corresponding to that segment.

In an embodiment, the alert component 710 may use one or more segments to create an alert. In an embodiment, the alert component 710 may use all of the segments to create an alert. For example, the alert may use the whole ring. In an embodiment, the alert component 710 may create an alert by changing the color in one or more segments of the augmentation overlay. In an embodiment, the alert component 710 may create an alert by changing the color of all of the segments of the augmentation overlay. For example, a segment color may change when an e-mail is received. In an embodiment, the color of one or more segments of the augmentation overlay may provide a specific meaning to the user. For example, the visually augmented bug implementation component 700 may present a red ring to indicate that a currently presented program is being recorded. For example, the visually augmented bug implementation component 700 may present a blue ring to indicate that a different program is being recorded. For example, the visually augmented bug implementation component 700 may present a green ring to indicate that a program has enhanced content available. For example, the visually augmented bug implementation component 700 may present a yellow ring to indicate the arrival of an incoming message. Other visual modifications may be implemented as well.

In an embodiment, the alert component 710 may create an alert by causing one or more segments to light-up and/or glow. In an embodiment, the alert component 710 may create an alert by causing all of the segments to light-up and/or glow. For example, a segment may light-up and/or glow when there is enhanced content available. Other visual modifications may be implemented as well.

In an embodiment, the alert component 710 may create an alert by causing a temporal variation in one or more segments of the augmentation overlay. In an embodiment, the alert component 710 may create an alert by causing a temporal variation in all of the segments of the augmentation overlay. In an embodiment, a temporal variation may be one or more pulsating, flashing or blinking segments. In an embodiment, the pulsating, flashing or blinking may be at a defined rate. For example, a slowly pulsating segment may inform the user of an upcoming program of interest and a rapidly pulsating segment may inform the viewer that the program of interest is currently airing and is not being recorded. Other visual modifications may be implemented as well.

In an embodiment, the visually augmented digital on-screen graphic implementation component 700 may include an information component 720. In an embodiment, the information component 720 may provide information based on a segment selected by a user. In an embodiment, when a user selects a segment, the segment may be expanded to provide further information. For example, if a user is watching a movie, the user may selects an "about" segment. In an embodiment, a user may select a segment corresponding to the "about" menu item. After the user selects the "about" segment and/or menu item, information about the movie including, but not limited to, the title, the release date and/or the name of the actors, may be presented on the electronic display. In an embodiment, when a user selects a segment, information may be presented which is more visually intrusive to the multimedia stream.

FIGS. 8A-D illustrate embodiments of a visually augmented digital on-screen graphic. In an embodiment, multimedia stream for the television station NBC® may be presented on an electronic display. A digital-on screen graphic 805 may be determined by the augmentation overlay determination component. The augmentation overlay determination component may determine the digital on-screen graphic 805 from one or more frames of the multimedia stream.

FIG. 8A depicts a frame from the multimedia stream. As shown in FIG. 8A, the digital on-screen graphic 805 may be the NBC® icon. The digital on-screen graphic 805 may be located in the lower right corner of the frame.

FIG. 8B depicts a circular augmentation overlay enhancing the digital on-screen graphic. In an embodiment, the circular augmentation overlay may surround the digital on-screen graphic. Once the digital on-screen graphic 805 is identified, an augmentation overlay may be selected. In an embodiment, the shape of the NBC® icon may be determined to be a semi-circle. As the digital on-screen graphic is a semi-circle, a circular augmentation overlay may be selected. In an embodiment, a semi-transparent circular augmentation overlay may be determined by the augmentation overlay determination component. FIG. 8B depicts an outline of a circle 810 surrounding the NBC® icon. The digital on-screen graphic 805 may be surrounded by a solid ring 810.

In an embodiment, one or more segments of the augmentation overlay may be determined. FIG. 8C depicts a segmented augmentation overlay. In FIG. 8C, the digital onscreen graphic may be surrounded by a dashed ring. In an embodiment, a segment 815 of the ring may indicate a menu item or category of an entertainment menu. For example, the ring may have six segments and each segment may correspond to an item or function in a menu.

In an embodiment, a segment 815 may be highlighted. In an embodiment, a segment 815 may be highlighted to alert a user. In an embodiment, are alert may indicate an activity, event of interest, or available item of interest in the secondary object accessible via the menu item corresponding to a segment 815. In an embodiment, a segment 815 may be highlighted because there is an activity in the corresponding menu item. For example, the segment "chat" 815 may be highlighted because another user has requested a chat session. In an embodiment, a segment may be highlighted because a program is about to start which the user may want to record. In an embodiment, a segment may be highlighted because addition information about the program is available. In an embodiment, a segment may be highlighted because enhanced content is available. The embodiments are not limited in this context.

FIG. 8D depicts a digital on-screen graphic surrounded by a selectable menu. In an embodiment, a menu item 820 corresponding to a segment 815 may be presented. In FIG. 8D, the menu items 820 may include, but is not limited to, myTV, share, shop, relate, chat and record. In an embodiment, selecting the menu item 820 corresponding to a segment 815 may trigger a secondary object.

In an embodiment, the segment corresponding to the menu item "myTV" may trigger a secondary object such as a listing of a user's favorite programs. In an embodiment, "myTV" may trigger information about a user's favorite TV programs to be presented on the electronic display. In an embodiment, menu item "myTV" may trigger a list of current and/or future programs on a particular channel. In an embodiment, menu item "myTV" may trigger a list of recommended television programs for the user based on past preferences.

In an embodiment, the segment corresponding to the menu item "share" may trigger a secondary object which enables a user to share information with other users. For example, if a user wants to suggest that another user record a program, the segment "share" may trigger a secondary object which enables a user to provide a fellow user with the suggestion. In an embodiment, the segment corresponding to the menu item "share" may trigger message boards and/or social networking sites to appear on the electronic display.

In an embodiment, the segment corresponding to the menu item "shop" may trigger a secondary object listing items that a user may buy. The segment "shopping" may trigger recommendations based on the current presented content and/or user preferences. For example, if a comedy is currently being presented and the user has previously shopped for books, the segment "shopping" may trigger a recommendation of a book written by a comedian.

In an embodiment, the segment corresponding to the menu item "relate" may trigger a list of items related to the current presented content. For example, if the user is watching a television program about baking, then the secondary object triggered for the segment "related" may include, but is not limited to, recipes, locations of nearby grocery stores, locations of nearby pastry shops and/or cooking supplies.

In an embodiment, the segment corresponding to the menu item "chat" may trigger a list of people with whom the user can currently chat. In an embodiment, the "chat" segment may trigger a voice and/or video chat program.

In an embodiment, the segment corresponding to the menu item "record" may trigger a list or set of television programs previously recorded on a DVR. The segment "record" may trigger a list or set of television programs to be recorded. The segment "record" may trigger a list or set of suggested television programs to DVR.

FIG. 8C illustrates a highlighted segment. In an embodiment, a segment may be highlighted. In an embodiment, a user may select the highlighted segment. FIG. 8D illustrates a highlighted menu item. After a user selects a highlighted segment, a menu corresponding to the segment may appear highlighted. In an embodiment, a menu corresponding to the segment may appear highlighted if a user moves a cursor over at least a portion of the augmentation overlay.

In an embodiment, a segment and the corresponding menu item, such as "chat", may be highlighted. In an embodiment, a segment and menu item may be highlighted to alert the user. For example, the segment and the corresponding menu item "chat" may trigger a secondary object of an interact based phone service, a voice and/or video chat program. The segment and menu item may be highlighted to alert the user that someone wants to chat with them. For example, the segment and corresponding menu item "chat" may be highlighted to alert the user that a particular person is available for a chat.

Figure 9:
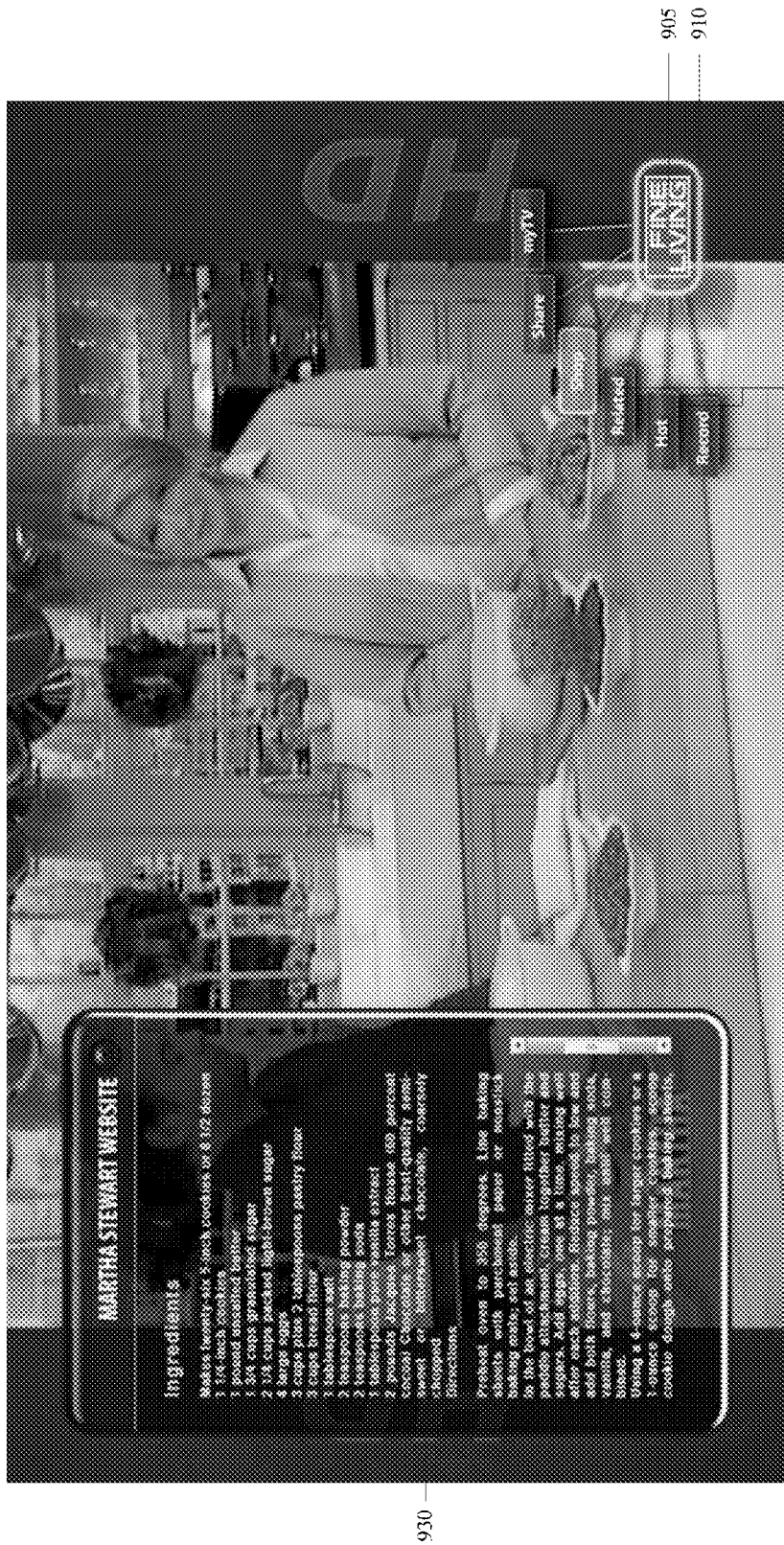
FIG. 9 illustrates an embodiment of a multimedia stream with the visually augmented digital on-screen graphic.

FIG. 9 illustrates an embodiment of a multimedia stream with the visually augmented digital on-screen graphic. As shown in FIG. 9, the digital on-screen graphic 905 may be determined to be the Fine Living box in the lower right corner of the multimedia stream. An augmentation overlay may be determined based on the Fine Living box. The Fine Living box may be in the shape of a rectangle. An augmentation overlay 910 may be determined to be an oval, a rectangle or another polygon that may at least partially surround the rectangular shape of the Fine Living box. In FIG. 9, an augmentation overlay 910 that is a rectangle with rounded corners may surround the digital on-screen graphic 905.

In an embodiment, the augmentation overlay may include segments. In an embodiment, the segments may trigger a secondary object 930. The segments may correspond to selectable menu items 920. In an embodiment, the augmentation overlay may be at least partially surrounded by one or more icons representing the menu items 920. In FIG. 9, the menu items 920 may be presented as text surrounded by a square shape. The menu items 920 may correspond to the segments and may radiate from the oval augmentation overlay 910. In an embodiment, the menu items 920 may correspond to entertainment categories such as, but not limited to, myTV, share, shop, relate, chat and record.

In an embodiment, a segment may be selected and the menu items may be presented as shown in FIG. 9. For example, a user may place a cursor above a segment corresponding to the menu item "shop" and the menu items 920 may appear. In an embodiment, the segment corresponding to menu item "shop" 920 may be selected and the menu item "shop" 920 may be highlighted. In an embodiment, if the segment corresponding to the menu item "shop" 920 is selected, a secondary object 930 may be triggered. In FIG. 9, the secondary object 930 may be a website.

For example, in FIG. 9, the multimedia stream may present a Martha Stewart cooking program. As a Martha Stewart cooking program is presented when a user selects the segment and corresponding menu item "shop" 920, the Martha Stewart website 930 may be triggered as the secondary object 930. The Martha Stewart website with the recipe corresponding to the current cooking program may be presented.

FIG. 10 illustrates one embodiment of a logic flow 1000. The logic flow 1000 may be representative of some or all of the operations executed by one or more embodiments described herein. It should be noted that the methods described herein do not have to be executed in the order described, or in any particular order. Moreover, various activities described with respect to the methods identified herein can be executed in serial or parallel fashion.

In the illustrated embodiment shown in FIG. 10, the logic flow 1000 may identify a digital on-screen graphic within a multimedia stream at block 1002. In an embodiment, the digital on-screen graphic may be integrated into the multimedia stream. In an embodiment, the digital on-screen graphic may be determined from one or more video frames from a multimedia stream for an electronic display. In an embodiment, the multimedia stream may be a live feed. In an embodiment, the multimedia stream may be a television program being presented on a broadcast channel. The multimedia stream may be analyzed to determine the digital on-screen graphic. The digital on-screen graphic may be a static image. In an embodiment, pattern recognition may be used to determine the digital on-screen graphic. In an embodiment, a mathematical calculation may be used to determine the digital on-screen graphic.

The logic flow 1000 may select an augmentation overlay based on the digital on-screen graphic at block 1004. In an embodiment, the shape, color, size and/or the dimensionality of the digital on-screen graphic may be determined. Based on the shape, color, size and/or the dimensionality of the digital on-screen graphic, an augmentation overlay may be selected. In an embodiment, a augmentation overlay may be selected from a library of augmentation overlays. Based on the digital on-screen graphic, an augmentation overlay may be selected so that the augmentation overlay blends in with the digital on-screen graphic. In an embodiment, the augmentation overlay may be non-visually instructive.

The logic flow 1000 may determine one or more segments of the augmentation overlay at block 1006. The augmentation overlay may be semi-transparent. The augmentation overlay may be depicted as the outline of a shape. For example, the augmentation overlay may be the outline or edges of a triangle. The edges of the triangle may be segmented. Segments may be determined based on user preferences, current content and input. A segment may correspond to an entertainment category. In an embodiment, each segment may correspond to an entertainment-related menu item. In an embodiment, a segment may trigger a secondary object. A secondary object may include an e-mail inbox, a received e-mail, a social networking website, a shopping website, a videogame and/or a list or set of suggested programs to record, among other examples.

The logic flow 1000 may present the segmented augmentation overlay on the electronic display to at least partially enhance the digital on-screen graphic at block 1008. In an embodiment, a user may be alerted of entertainment-related events based on the segmented augmentation overlay. In an embodiment, an alert may be created based on an incoming message, a program to be recorded, related content, shopping opportunities, and/or enhanced content. In an embodiment, a color of a segment maybe changed, the segment may flash and/or the segment may be highlighted based on entertainment-related event.

Alerts may be for entertainment-related events such as, but are not limited to, an incoming e-mail message, a program to be recorded, related shopping opportunities on the Web, and/or enhanced content based on the segmented augmentation overlay, among other examples. In an embodiment, a user may be alerted by changing the color of one or more segments, flashing at least one or more segments, and/or lighting up one or more segments, among other examples.

Figure 11:
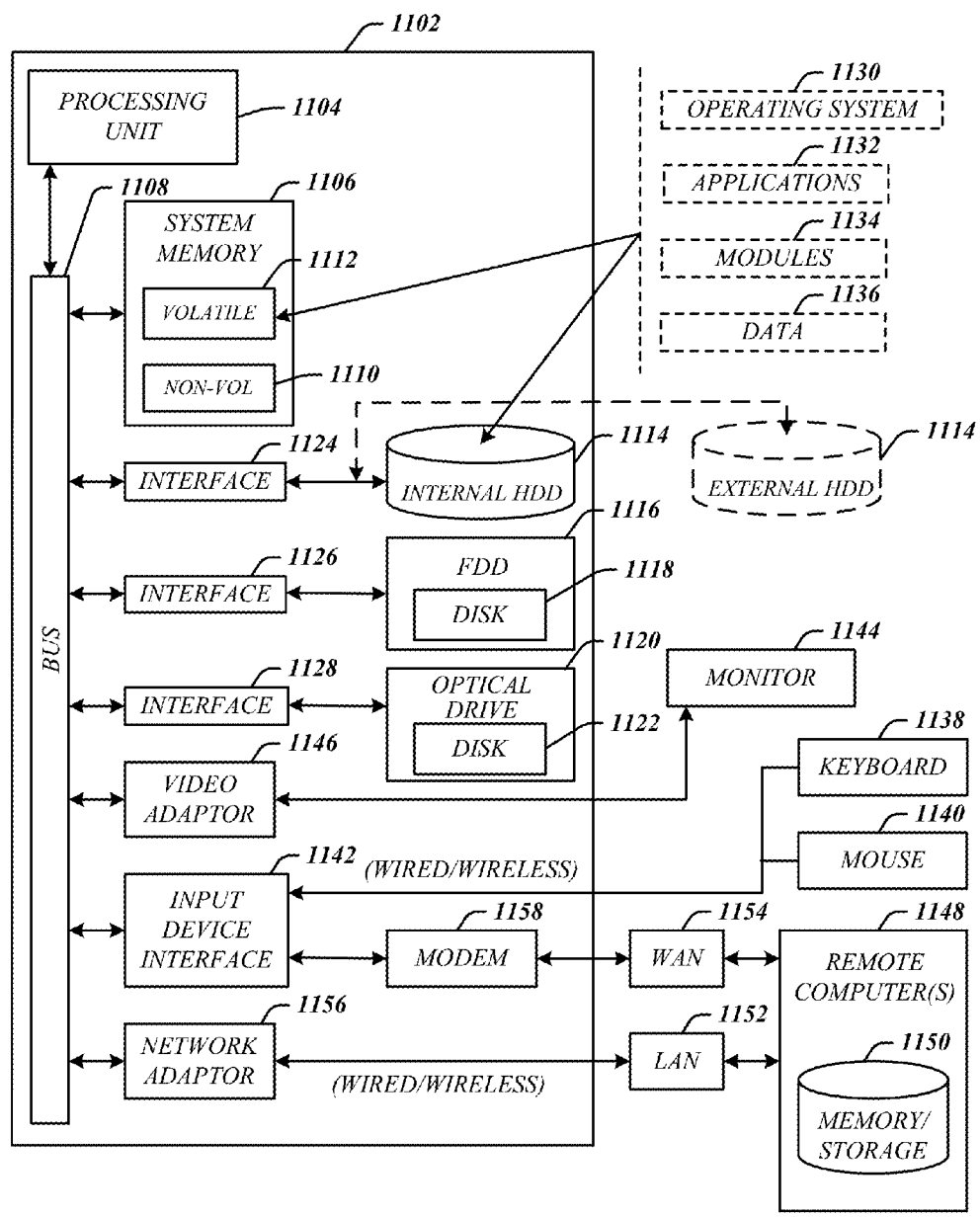
FIG. 11 illustrates one embodiment of a computing architecture.

FIG. 11 illustrates an embodiment of an exemplary computing architecture 1100 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multi storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1100 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1100 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors. Dual microprocessors and other multi processor architectures may also be employed as the processing unit 1104. The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures.

The computing architecture 1100 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 11, the system memory 1106 can include non-volatile memory 1110 and/or volatile memory 1112. A basic input/output system (BIOS) can be stored the non-volatile memory 1110.

The computer 1102 may include various types of computer-readable storage media in the form of one or more lower speed memory units, including an internal hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136.

The one or more application programs 1132, other program modules 1134, and program data 1136 can include, for example, the visually augmented digital on-screen graphic component 300, digital on-screen graphic recognition component 400, augmentation overlay determination component 500, menu segmentation component 600 and visually augmented digital on-screen graphic implementation component 700.

A user can enter commands and information into the computer 1102 through one or more wire/wireless input devices, for example, a keyboard 1138 and a pointing device, such as a mouse 1140. Other input devices may include a microphone, an infra-red (IR) remote control, a joystick, a game pad, a stylus pen, touch screen, or the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
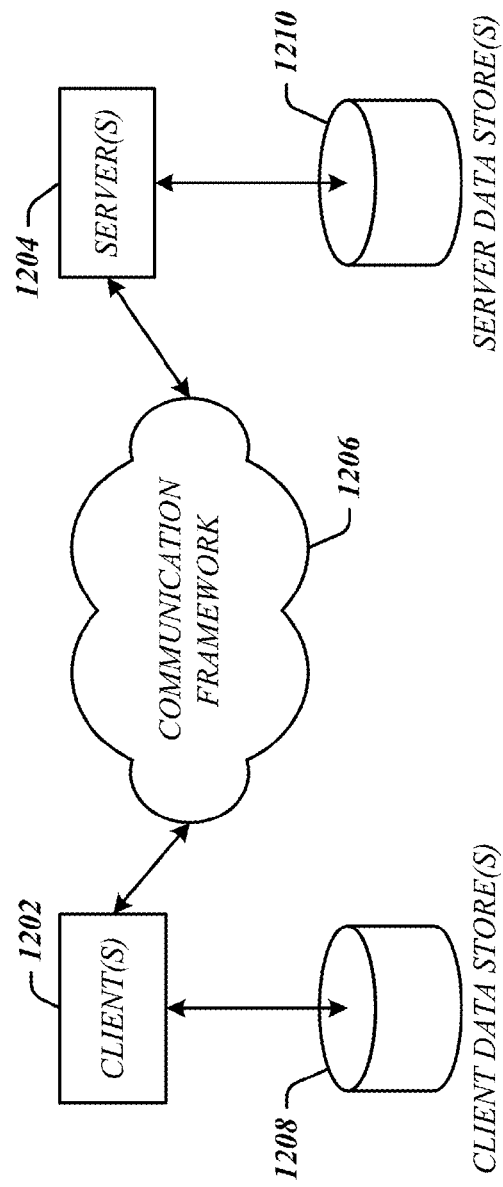
FIG. 12 illustrates one embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, and so forth. The embodiments, however, are not limited to implementation by the communications architecture 1200.

As shown in FIG. 12, the communications architecture 1200 comprises includes one or more clients 1202 and servers 1204. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols, such as those described with reference to systems 300, 400, 500, 600, 700 and 1000. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An article of manufacture comprising a non-transitory machine-readable storage medium containing instructions that when executed enable a system to:
    identify a digital on-screen graphic within a multimedia stream for an electronic display;
    determine an augmentation overlay based on the digital on-screen graphic;
    determine a first segment for the augmentation overlay based on user preferences;
    determine a second segment for the augmentation overlay based on the multimedia stream;
    determine a third segment for the augmentation overlay based on an alert, the alert based on an incoming message, a program to be recorded, related content, shopping opportunities, an entertainment-related event, or enhanced content, the third segment to indicate the incoming message, the program to be recorded, the related content, the shopping opportunities, the entertainment-related event, or the enhanced content;
    scale a size of the augmentation overlay based on a size of the digital on-screen graphic; and
    present the augmentation overlay comprising the first segment, the second segment, and the third segment on the electronic display, the augmentation overlay to at least partially surround the digital on-screen graphic.

2. The article of claim 1, the second segment to correspond to entertainment-related menu items.

3. The article of claim 1, further comprising instructions that when executed enable the system to:
    determine a selected segment from among the first segment, the second segment, or the third segment; and
    present a secondary object on the electronic display based on the selected segment.

4. The article of claim 1, further comprising instructions that when executed enable the system to:
    determine a set of multiple frames from the multimedia stream; and
    use an integration calculation to determine the digital on-screen graphic using the set of frames.

5. The article of claim 1, further comprising instructions that when executed enable the system to:
    compare a static image in multiple frames of the multimedia stream to a library of digital on-screen graphics; and
    determine that the static image matches a digital on-screen graphic from the library.

6. The article of claim 1, further comprising instructions that when executed enable the system to:
    determine a repeated image on a bottom half of multiple sequential frames of the multimedia stream; and
    determine that the repeated image is the on-screen graphic.

7. The article of claim 1, further comprising instructions that when executed enable the system to:
    determine a shape of the digital on-screen graphic, the shape comprising:
    a rectangle, a circle, a triangle or a polygon.

8. The article of claim 1, further comprising instructions that when executed enable the system to:
    determine a color of the augmentation overlay; and
    blend the color of the augmentation overlay with one or more of the digital on-screen graphic and one or more frames of the multimedia stream.

9. The article of claim 1, further comprising instructions that when executed enable the system to:
    determine whether digital on-screen graphic is two-dimensional (2D) or three-dimensional (3); and
    present the augmentation overlay as either 2D or 3D based on the determination.

10. The article of claim 1, further comprising instructions that when executed enable the system to:
    change a color of the augmentation overlay based on an entertainment-related event.

11. The article of claim 1, further comprising instructions that when executed enable the system to:
    flash the augmentation overlay on the electronic display at a defined rate based on an entertainment-related event.

12. A method comprising:
    identifying a digital on-screen graphic within a multimedia stream for an electronic display;
    selecting a augmentation overlay based on the digital on-screen graphic;
    determining a first segment for the augmentation overlay based on user preferences;
    determining a second segment for the augmentation overlay based on the multimedia stream;
    determining a third segment for the augmentation overlay based on an alert, the alert based on an incoming message, a program to be recorded, related content, shopping opportunities, an entertainment-related event, or enhanced content, the third segment to indicate the incoming message, the program to be recorded, the related content, the shopping opportunities, the entertainment-related event, or the enhanced content;

scaling a size of the augmentation overlay based on a size of the digital on-screen graphic; and presenting the augmentation overlay comprising the first segment, the second segment, and the third segment on the electronic display, the augmentation overlay to at least partially surround the digital on-screen graphic.

13. The method of claim 12, further comprising:

determining a segment of the first segment, the second segment, or the third segment selected by a user; and presenting a secondary object based on the selected segment.

14. The method of claim 12, further comprising:

determining one or more menu items corresponding to at least one of the first segment, the second segment, or the third segment, the menu items comprising: favorites, share, shop, relate, chat or record.

15. The method of claim 12, further comprising:

using pattern recognition to locate the digital on-screen graphic.

16. The method of claim 12, further comprising:

determining a set of multiple frames from the multimedia stream; and using a mathematical calculation to determine the digital on-screen graphic using the set of frames.

17. The method of claim 12, further comprising:

comparing a static image in multiple frames of the multimedia stream to a library of digital on-screen graphics; and determining that the static image matches a digital on-screen graphic from the library.

18. The method of claim 12, further comprising:

determining a repeated image on a bottom half of multiple sequential frames of the multimedia stream; and determining that the repeated image is the on-screen graphic.

19. The method of claim 12, further comprising:

determining a shape of the digital on-screen graphic, the shape comprising: a rectangle, a circle, a triangle or a polygon.

20. The method of claim 12, further comprising:

determining a color of the augmentation overlay; and blending the color of the augmentation overlay with one or more of the digital on-screen graphic and one or more frames of the multimedia stream.

21. The method of claim 12, the alert including highlighting the third segment to indicate the incoming message, the program to be recorded, the related content, the shopping opportunities, the entertainment-related event, or the enhanced content.

22. The method of claim 12, the alert including changing a color of the third segment to indicate the incoming message, the program to be recorded, the related content, the shopping opportunities, the entertainment-related event, or the enhanced content.

23. An apparatus comprising:

a processor; and a visually augmented digital on-screen graphic component operative on the processor to navigate a multimedia stream, the visually augmented digital on-screen graphic component comprising:

a digital on-screen graphic recognition component operative to identify a digital on-screen graphic within the multimedia stream, an augmentation overlay determination component operative to:

determine an augmentation overlay based on the digital on-screen graphic, the augmentation overlay to at least partially surround the digital on-screen graphic, scale a size of the augmentation overlay based on a size of the digital on-screen graphic, a menu segmentation component operative to:

determining a first segment for the augmentation overlay based on user preferences; and determining a second segment for the augmentation overlay based on the multimedia stream;

determine a third segment for the augmentation overlay based on an alert; and a visually augmented digital on-screen graphic implementation component including an alert component operative to create the alert based on an incoming message, a program to be recorded, related content, shopping opportunities, an entertainment-related event, or enhanced content, the alert to use the third segment to indicate the incoming message, the program to be recorded, the related content, the shopping opportunities, the entertainment-related event, or the enhanced content.

24. The apparatus of claim 23, the alert component to change a color of at least the third segment of the augmentation overlay to create the alert.

* * * * *